May 13, 1969 H. B. HERTZSCH 3,443,287
CAN CHANGING IN STRAND MATERIAL HANDLING
Filed July 26, 1966
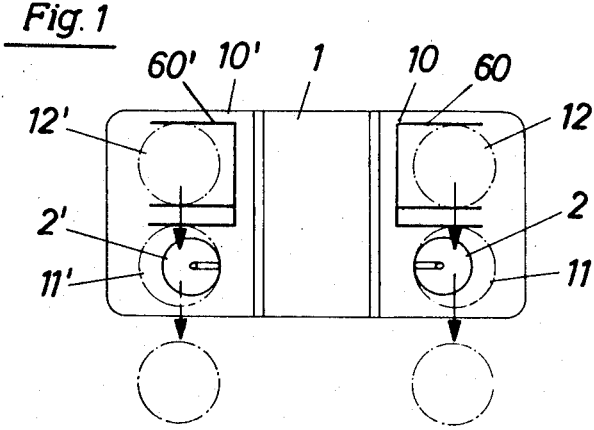
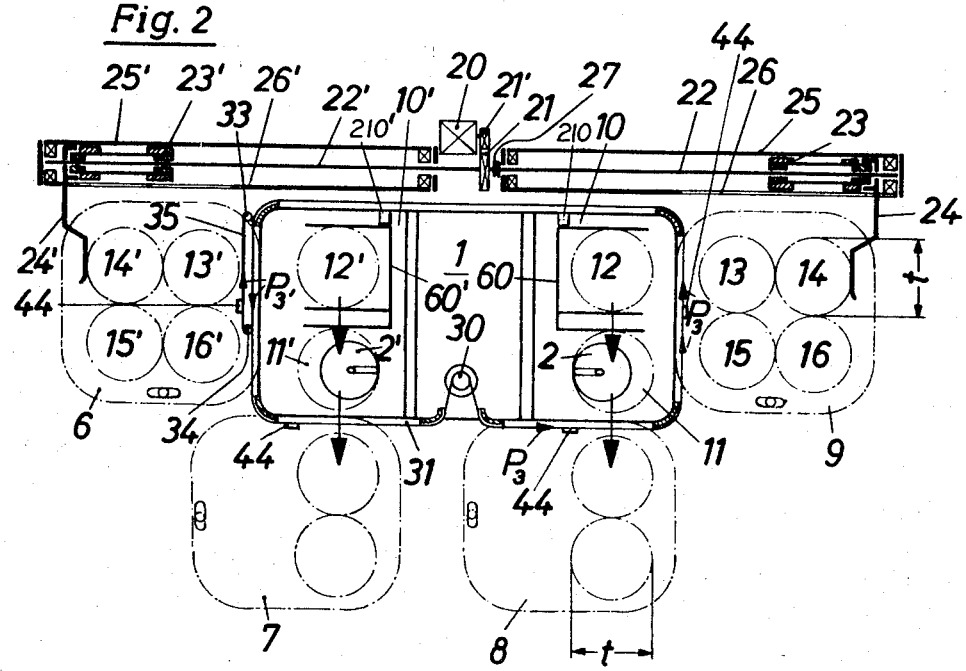
INVENTOR
HANS B. HERTZSCH
BY
Burgess, Dinklage & Sprung
ATTORNEYS.

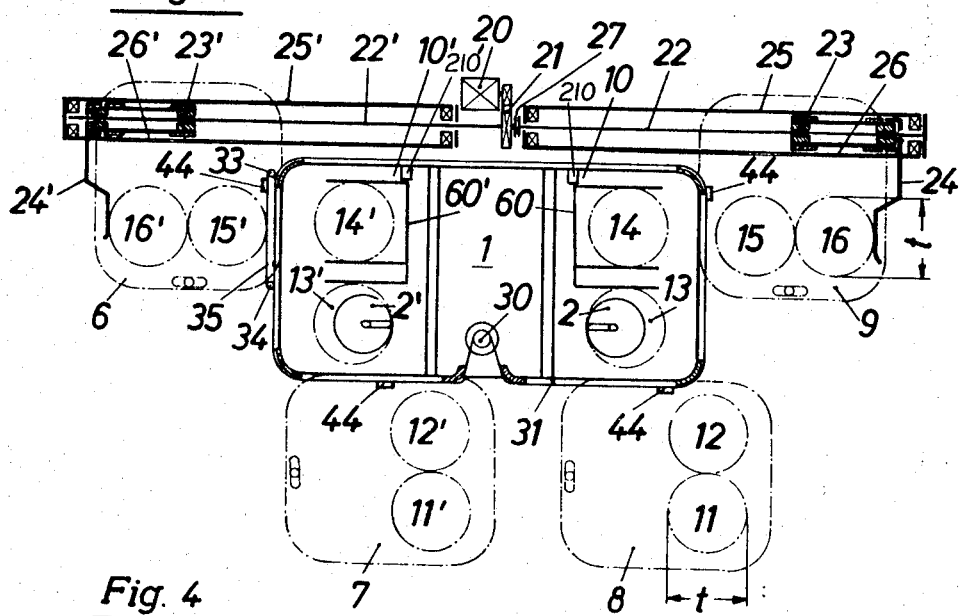
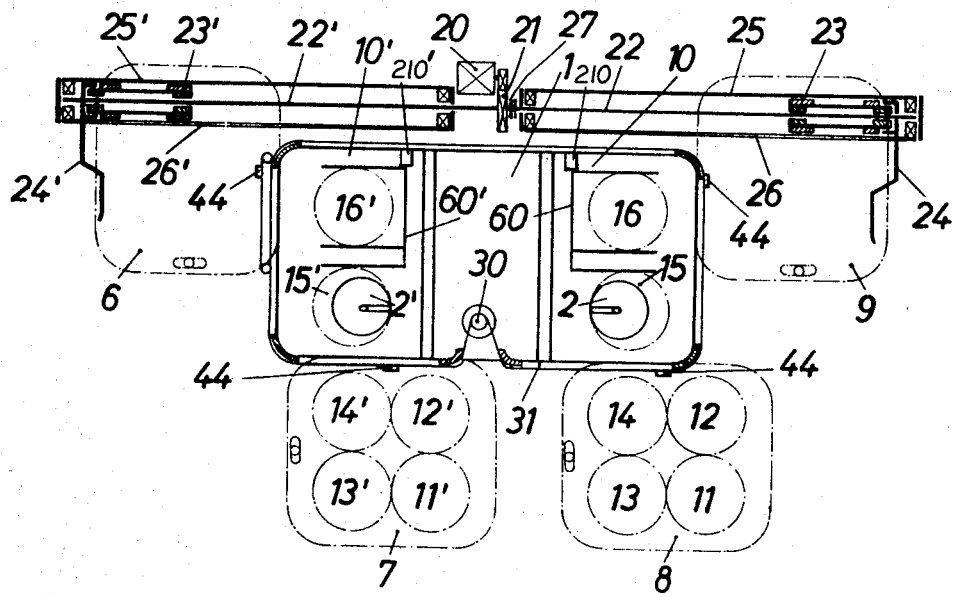

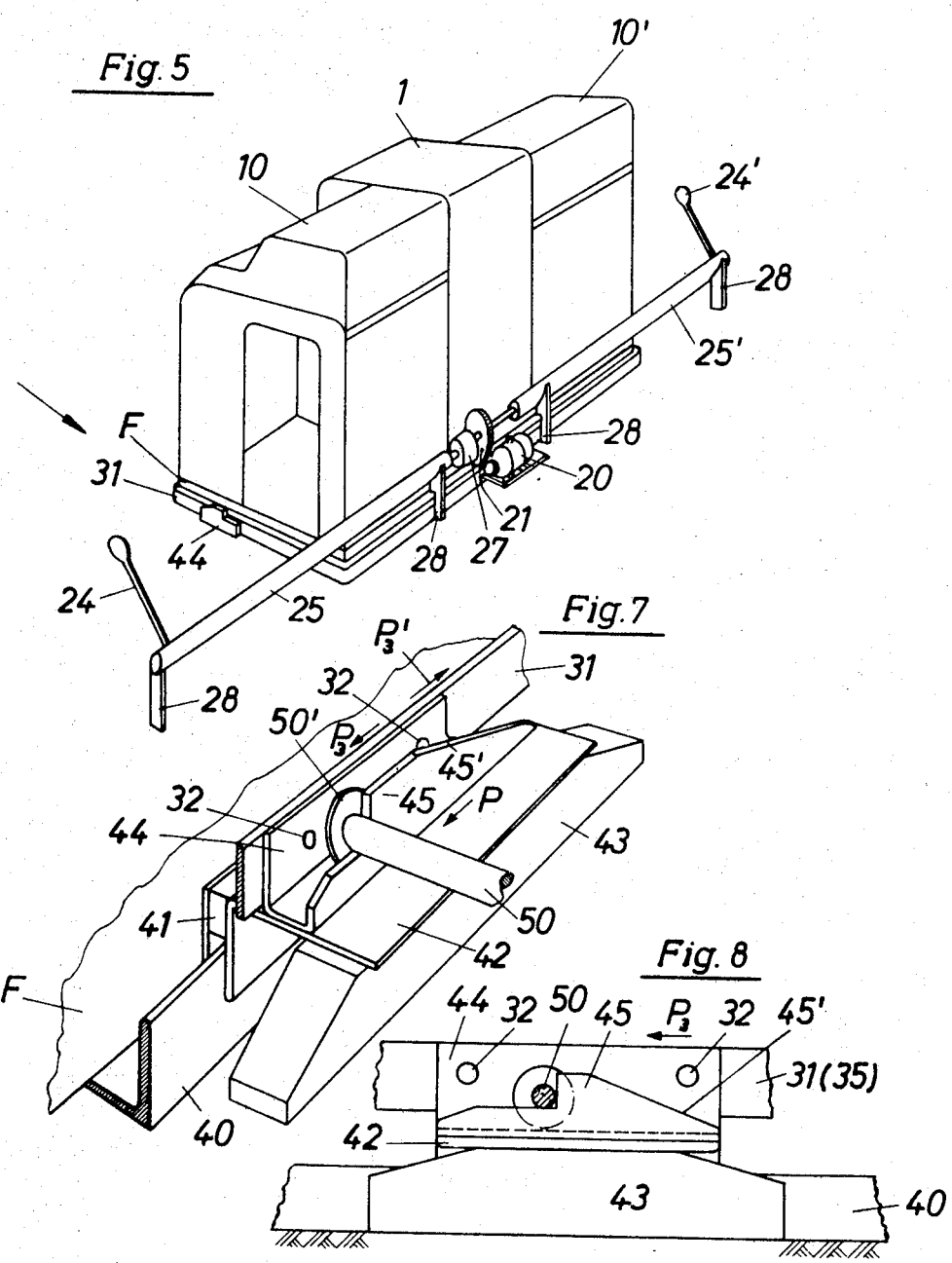

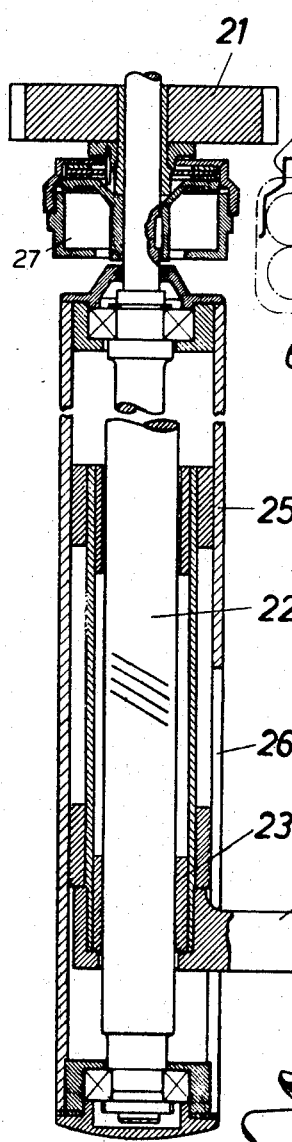
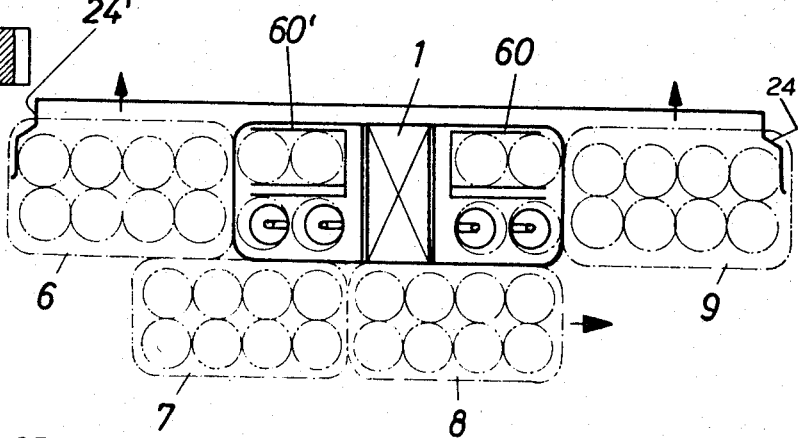
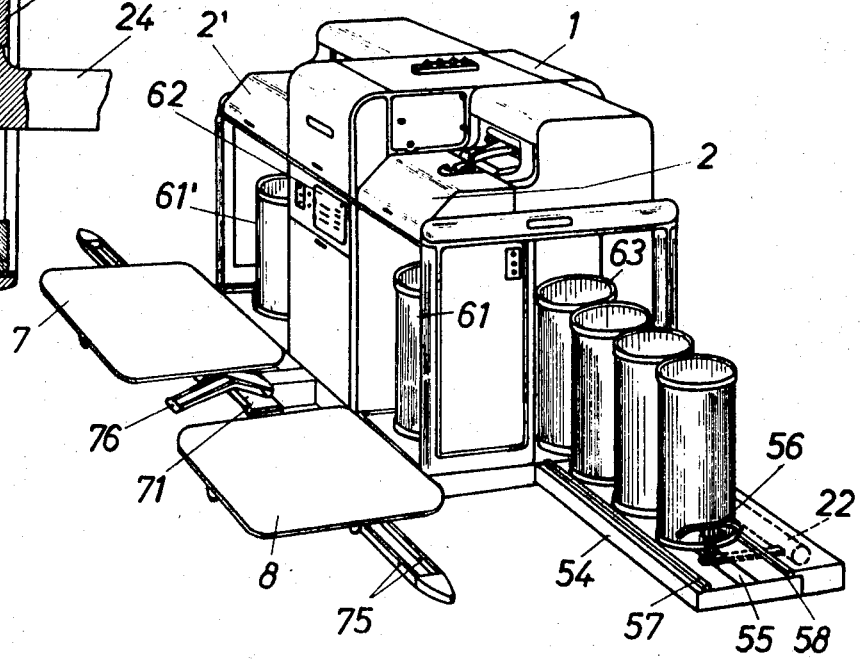

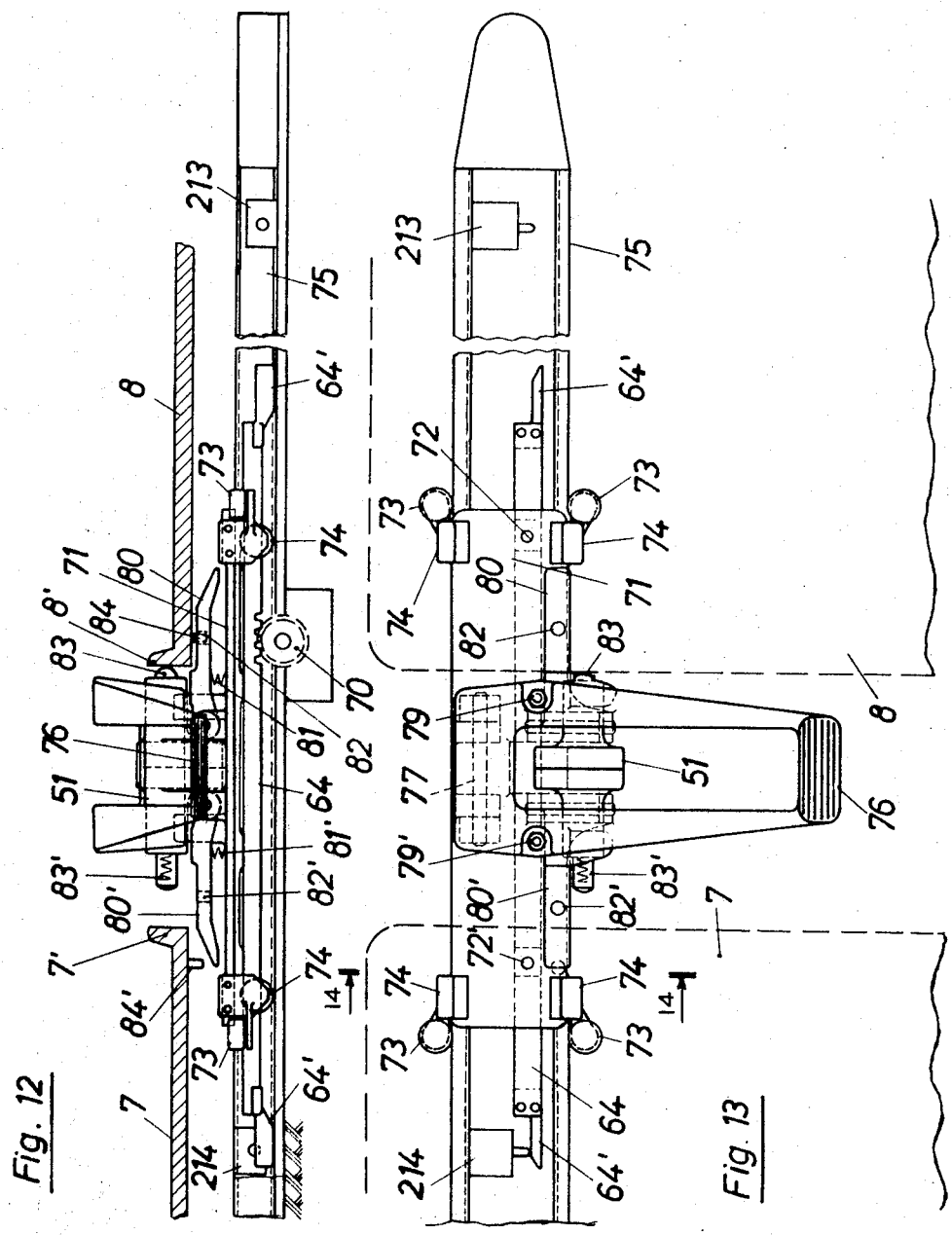

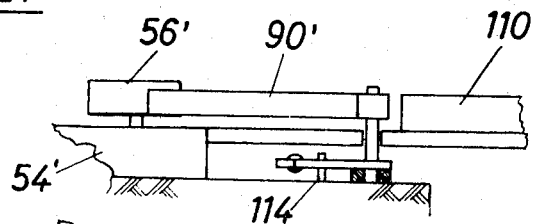
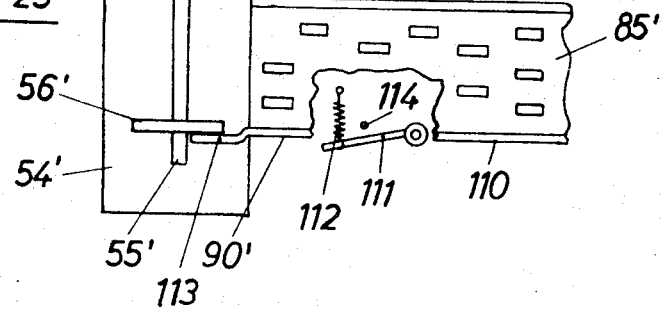
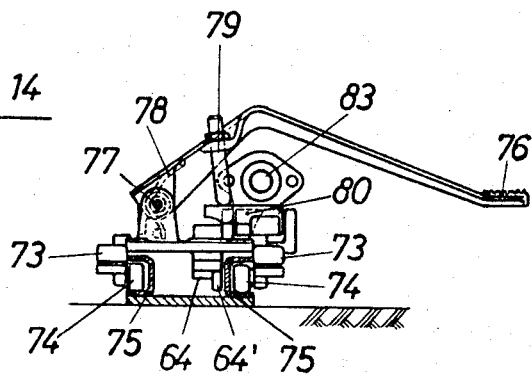

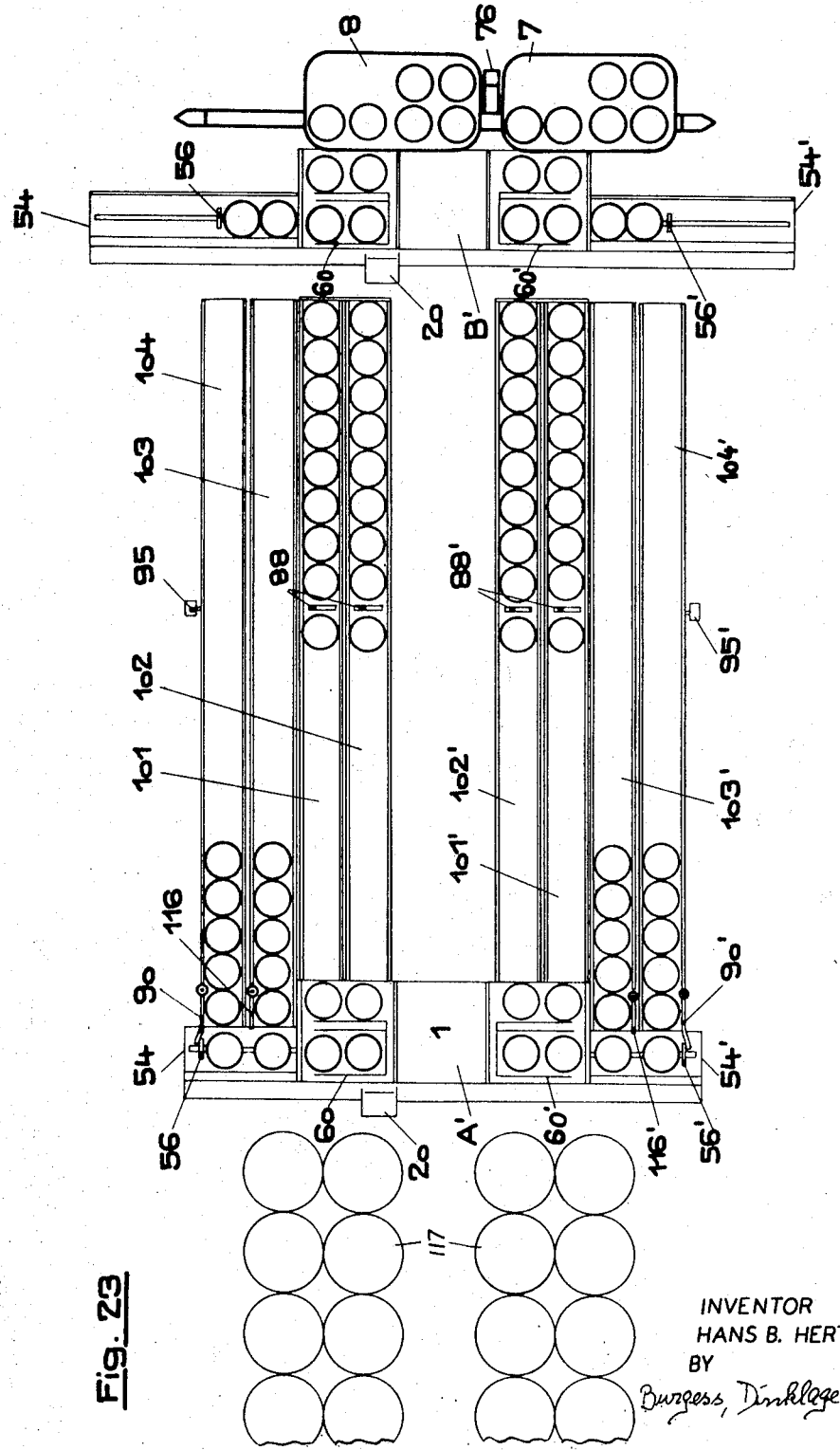

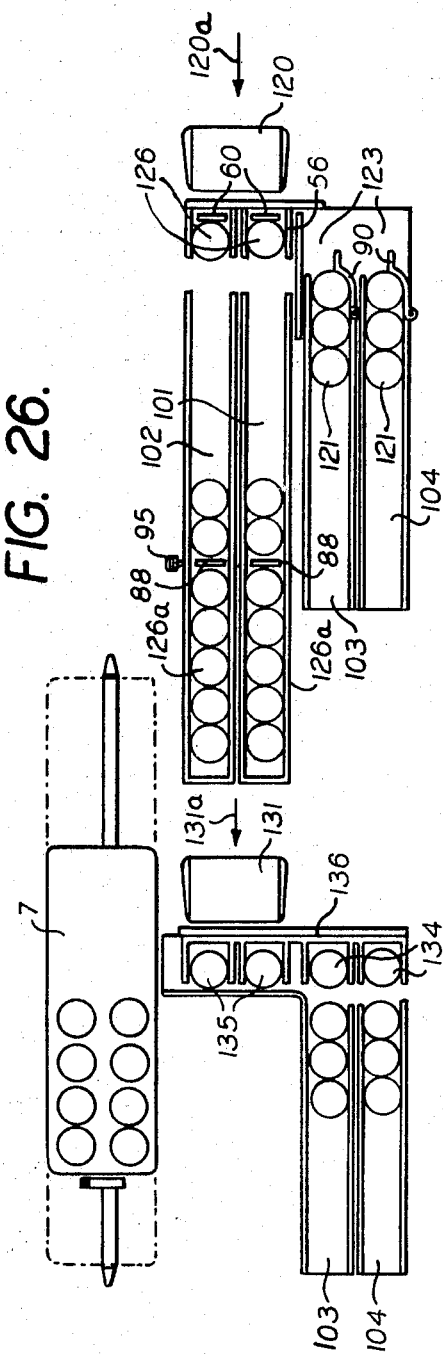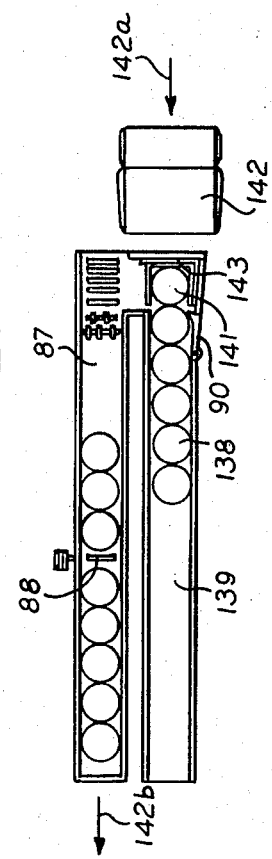

United States Patent Office 3,443,287
Patented May 13, 1969

3,443,287
CAN CHANGING IN STRAND MATERIAL HANDLING
Hans B. Hertzsch, Enschede, Netherlands, assignor to Deutscher Spinnereimaschinenbau Ingolstadt Niederlassung der Schubert & Salzer Maschinenfabrik Aktiengesellschaft, Ingolstadt, Donau, Germany, a corporation of Germany
Continuation-in-part of application Ser. No. 256,220, Feb. 1, 1963. This application July 26, 1966, Ser. No. 569,556
Claims priority, application Germany, Feb. 9, 1962, D 38,105; Jan. 12, 1963, D 40,673
Int. Cl. D04h 11/00, 11/04
U.S. Cl. 19—159                                            24 Claims

ABSTRACT OF THE DISCLOSURE

The automating of can changing in the production of roving. Provision is made for automatically supplying sliver cans to a filling station and for removing filled cans from the filling station.

---

This application is a continuation-in-part of application Ser. No. 256,220, filed Feb. 1, 1963, now abandoned. Application Ser. No. 802,694, filed Feb. 6, 1969 is a continuing application; access to said Ser. No. 802,694 is hereby granted.

The invention relates to an automatic can changing for machines used, for example, in the production of roving, especially for drawing frames using sliver cans arranged in tandem in the direction of the movement of the sliver.

To reduce to a minimum the loss of production entailed in the manual replacement of sliver cans, various apparatus have been proposed to replace the manual operation with a wholly or partially automatic can change. These known apparatus are adapted to certain particular types of machines used in the production of roving, such as cards, drawing frames, sliver lap machines or combing machines, the can change being performed by swinging the sliver outfeed plate from the full can to an adjacent empty can (German Patent 860,913) or by switching the sliver plate from the full to the empty can without changing the location of the cans, in such a manner that the sliver is always discharged in the same direction, but at points further forward or rearward (German Patent 882,663). Another group of prior art can filling apparatus produces the can change, in the case of cans arranged in tandem in the direction of the movement of the sliver, by using a pushing device controlled by the meter to push the full can away and at the same time to advance the empty can into the filling position in place of the full can; in this case, dollies or trucks (German Patent 574,-331) or conveyor belts (German Patent 1,036,132) are used for the transport or feeding of the empty cans. Turntables are also known, on which the cans are arranged in a circle, the turntable revolving together with the cans, as each can is filled, by an amount corresponding to the spacing from can to can, thus replacing the full can with an empty one. When these known apparatus are simple in design, they do not entirely eliminate manual handling, and those which are fully automatic in operation are often very complex in construction, and therefore they are prone to mechanical trouble.

The apparatus that forms the subject of the invention is distinct from these known apparatus in that the empty cans are automatically pushed, preferably in a direction perpendicular to that of the movement of the sliver, from a gathering point or collecting area located laterally of the drawing frame, into a ready position within the machine, and the full cans are automatically advanced preferably in the same direction as the movement of the sliver to another gathering point in front of the machine.

According to another feature of the new can changing apparatus, one of the transporting means, namely the one designed to carry away full cans, is disposed immediately in front of the place at which the filled cans are ejected, and it can be displaced crosswise to the direction of movement of the sliver, and the transporting means designed to feed empty cans is disposed so as to be displaceable contrary to and parallel with the direction of movement of the sliver, means being provided for the simultaneous displacement of both transporting means by an amount corresponding to the diameter ($t$) of the aligned cans.

According to a variant of the invention, the empty cans can be fed in by a ramp disposed laterally of the drawing frame and serving as a gathering place for the cans, rather than by conveyances on wheels.

According to the invention, for the purpose of moving the empty cans from the dollies stationed, or feed carriages disposed on both sides of the machine towards the drive box, pushing arms are provided which are displaceable along the rear wall of the machine.

Particularly well suited for the automatic can changing apparatus of the invention are drawing frames of symmetrical construction based on German Patent No. 1,097,867, in which the drive box of the machine is disposed in the center. This type of drawing frame, which can be equipped with 2, 4 or even more heads, is easily accessible from both sides and therefore makes it possible in a simple and efficient manner to bring the empty cans out and the full cans in and to feed slivers to the machine input.

Further details of the can changing apparatus of the invention are described hereinbelow on the basis of various examples of embodiment shown in the drawings.

FIG. 1 is the plan view of a drawing frame of known design based on German Patent 1,097,867, the representation being schematic;

FIGS. 2, 3, and 4 show schematic representations of a drawing frame with the apparatus of the invention and indicate stages of the operation in utilization thereof;

FIG. 5 is a perspective view of a drawing frame with the apparatus of the invention;

FIG. 6 shows the pusher arm drive, in section;

FIGS. 7 and 8 show an embodiment of the coupling for connecting a dolly or platform to the pulling member;

FIG. 9 is a schematic representation of the plan view of a drawing frame having two sets of two filling stations or outputs each, and can handling apparatus of the invention;

FIG. 10 shows an embodiment of can changing apparatus on a drawing frame with two outputs;

FIG. 12 is an elevation view of the drive for the can dollies shown in FIG. 10;

FIG. 13 is a plan view of the drive shown in FIG. 12;

FIG. 14 is a cross-section taken on line 14—14 in FIG. 13;

FIG. 23 shows an embodiment for two drawing frames disposed in tandem and having four working stations;

FIGS. 24 and 25 show, respectively, in elevation and plan a braking mechanism used in the apparatus shown in FIG. 16; and FIGS. 26 and 27 show in schematic form alternative arrangements of the apparatus of the invention.

In the various views, like reference characters refer to corresponding parts.

Figure 11:
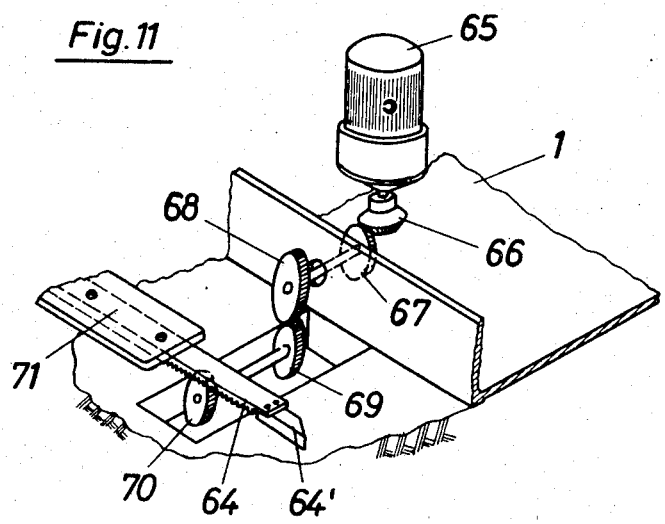
FIG. 11 shows the drive of the can dollies for the embodiment shown in FIG. 10.
Figure 21:
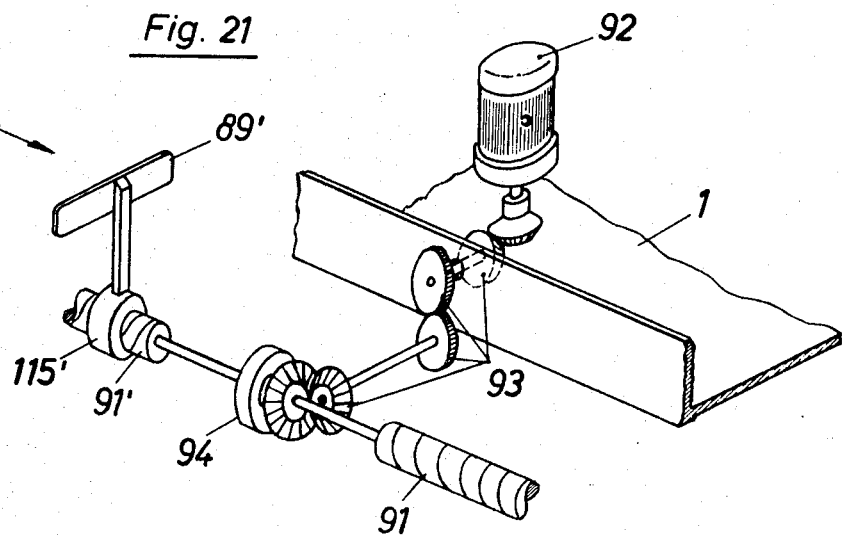
FIG. 21 shows in perspective the drive of the distributing mechanism shown in plan in FIG. 20.

FIG. 1 represents a drawing frame of the prior art based on German Patent 1,097,867, having a central drive box 1 and working stations 10 and 10' disposed on the sides of the drive box.

The material being drawn passes through the machine in the direction of the arrow. The cans 11 and 11' disposed at a filling station are filled beneath the two sliver plates 2 and 2'. After cans 11 and 11' underneath the sliver plates 2 and 2' have been filled, they are pushed out of the machine in the direction of the arrow by means of a prior art can changing apparatus which is connected with a counting mechanism 62 (FIG. 10). This ejection is performed by means of pivoting can forks 60 and 60', while at the same time additional empty cans 12 and 12' shown at ready stations are pushed by these same can forks 60 and 60' into the place of the ejected cans beneath sliver plates 2 and 2'. In the case of the drawing frame represented in FIG. 1, when the can exchange has been completed it is necessary to place another empty sliver can into the machine by hand and take the full can standing in front of the machine and place it by hand on a can dolly or other means of conveyance in order to carry it to where it will be further processed. This manual work is extensively eliminated or substantially simplified by the innovation represented schematically in FIGS. 2 to 25.

To this end, a motor 20 is disposed on the rear of drive box 1, said motor driving two threaded shafts 22 and 22'. Screws 22 and 22' are horizontally mounted in tubes 25 and 25', respectively, the latter being held on supports 28 fastened to the floor (FIG. 5). Supports 28 are high enough for the can platforms or trucks 6, 7, 8, and 9, when empty, to pass easily under tubes 25 and 25'. Pushing arms 24 and 24' fastened to nuts 23 and 23' are moved horizontally by the screws 22 and 22', pushing arms 24 and 24' extending out of tubes 25 and 25' through slots 26 and 26' (FIG. 6). 27 is an adjustable safety clutch which slips in case the pushing arms 24 or 24' should bind, thus preventing the breakage of the pushing arm or destruction of any cans that might become jammed. Around the base F of the machine (FIG. 5) runs an endless cable drive or pulling member 31 which is driven by a motor 30 disposed in the central drive box 1 of the drawing frame. Over the rollers 33 and 34 runs a second endless pulling member 35, which is coupled with the pulling member 31 and reverses the latter's direction of movement. The arrows $P_3$ and $P_3'$ indicate, respectively, the direction of movement of the pulling members 31 and 35. Two couplings 44 on the front of the machine and one coupling 44 on one side of the machine are fastened to the pulling member 31 for the purpose of interconnecting the can dollies 7, 8, and 9. Another coupling for can dolly 6 is located on the pulling member 35.

FIG. 7 shows in detail an example of the embodiment of the coupling 44 for hitching the can dollies to the pulling member 31 or 35, as the case may be. Coupling 44 is fastened to pulling members 31 by rivets 32. It consists substantially of a hook 45 with a ramp surface 45', and is associated with a slide 41. Slide 41 slides along a track 40 fastened to the base F of the machine or to the floor. The stud 50 with head 50' is fastened to the can dolly and is engaged with the coupling 44 as soon as the pulling member 31 moves in the direction of arrow $P_3$. The pulling member 35 engages in like manner with a dolly stud 50.

In the hitching of a can dolly, stud 50 first slides up on ramp surface 45' and then snaps into coupling 44 behind hook 45, upon manually pushing the can dolly up the coupling ramp 45' in the direction of the arrow P. The can dolly is thus lifted briefly when stud 50 runs up ramp surface 45' of hook 45, until stud 50 drops behind hook 45. To prevent slide 41 from being bent or made to bind by the weight of the can dolly when it is hitched on, a supporting ramp 43 is disposed alongside track 40 in the starting position of pulling member 31 or in the hitching position of coupling 44, and plate 42 rests on this ramp.

As shown in FIG. 2, two can platforms or dollies 6 and 9 are placed on either side of the machine as a gathering place for four empty cans each, 13, 14, 15, and 16, and 13', 14', 15', and 16', respectively, and each is coupled to the pulling member 31, or 35 as the case may be, by a coupling 44. The empty can platform 6 is disposed with the portion thereof carrying cans 13' and 14', aligned with the fork 60' when the fork is in the position shown in FIG. 2, for movement of the cans to the fork, upon operation of the pushing arm 24. Thus, a portion of the platform 6 serves as a slideway for the cans. What is said as to empty can platform 6 applies also to platform 9. Upon shifting of the empty can platforms 6 and 9, as is elsewhere described herein, the said platforms move so that the parts thereof carrying, respectively, cans 15' and 16', and 15 and 16, serve as the slideway. In the front of the drawing frame there are placed two can dollies 7 and 8 which are not carrying any cans and which are hitched in like manner by couplings 44 to pulling members 31 and serve as a gathering point for the full cans. During the can changing process, the full cans are pushed onto can dollies 7 and 8, ready to be hauled away.

The manner of operation of the apparatus explained in detail above is the following:

To ready the drawing frame, two can platforms or dollies 6 and 9 are brought with empty cans to the can input sides, and two empty can dollies 7 and 8 are brought to the can ouput side in such manner that the dollies are hooked into the couplings 44. The can dollies can also be hitched by a movement of cable or pulling member 31 in the direction of the arrow $P_3$ (FIG. 7).

When the cans 11 and 11', which are at the filling stations, are filled, they are pushed by forks 60 and 60' onto can dollies 7 and 8 provided for this purpose. At the same time, forks 60 and 60' push empty cans 12 and 12', which are standing in the ready stations in the drawing frame, into the place of the full cans 11 and 11'. After this can change, forks 60 and 60' are swung up and return to their initial position. Then an appropriate switching device, such as a limit switch 210 or 210' is actuated by fork 60 or 60', or a program switch, starts motor 20 for the operation of the pushing arms 24 and 24'.

The pushing arms 24 and 24' move perpendicularly to the direction of movement of the sliver over a slideway for the cans and push the next empty cans 13 and 13' from the can dollies 9 and 6, respectively, into the ready position in the machine.

As soon as cans 12 and 12' are filled, the forks 60 and 60' are operated again, and the process described above is repeated, filled cans 12 and 12' being pushed onto can dollies 8 and 7, respectively, which already have cans 11 and 11' on them, while the empty cans 13 and 13' take their place. The next empty cans 14 and 14' are then brought into the machine by the pushing arms 24 and 24' in the manner described above.

Thereupon the pushing arms 24 and 24' return to their initial position. The shifting of the can dollies now takes place while the drawing frame continues to operate without interruption. To this end, the motor 30 housed in the central drive box 1 of the drawing frame moves the pulling member 31 at least the amount of the can diameter $t$, so that the can dollies 6, 7, 8, and 9 hitched to the pulling members 31 and 35 all simultaneously assume the positions shown in FIG. 3. The can dollies 6 and 9 thereby pass beneath the tubes 25 and 25', respectively. Cans 15 and 16, and 15' and 16', then stand on the can dollies 6 and 9 in the ready position, while can dollies 7 and 8 are carried laterally in front of the machine in such a manner that they can receive additional full cans. The movement of the can dollies is controlled as is described in more detail in reference to FIG. 16, hereinafter. Thus, movement of arm 24 (in response to actuation of switch 210 which operates motor 20) actuates switch 211, whereupon motor 20 is stopped to stop travel of arm 24, at which time can 13 has been moved into fork 60. Upon further operation of motor 20 in response to actuation of switch 210, the arm 24 moves on to contact switch 212. This switch is then effective to cause operation of the motor 20 to return the arm 24 to its initial position and to operate the motor 30 to shift the can dollies. Arm 24' and switches 210', 211', and 212' operate in a similar manner. The succeeding can change is performed in the same manner as described above.

FIG. 4 shows the final phase of the can change after the can dollies 6 and 9 have been emptied and can dollies 7 and 8 are occupied by full cans. The two can dollies 7 and 8, as well as the now empty can dollies 6 and 9 can be automatically released from the couplings 44 when the pulling member 31, or 35 as the case may be, is run back by motor 30. This operation of the motor 30 can be manually controlled or can be programmed.

It is not until now, after four automatic can changes, that more can dollies carrying empty cans and empty can dollies for receiving the full cans have to be brought up, whereupon the process described is repeated.

Figure 16:
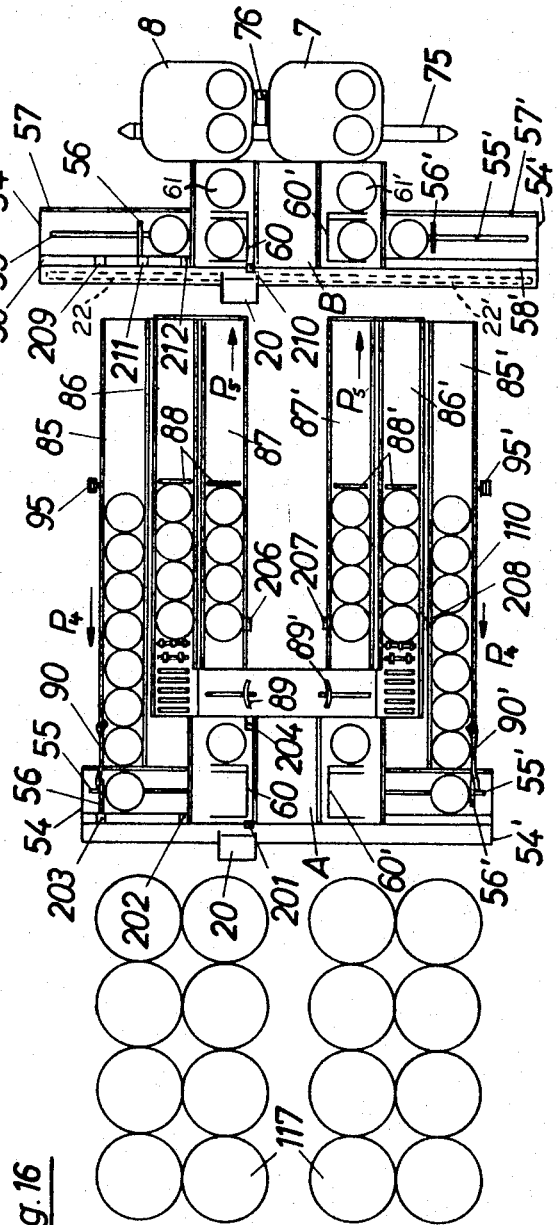
FIGS. 16–19 show in schematic form various working positions of the automatic can changing apparatus according to FIG. 15.
Figure 17:
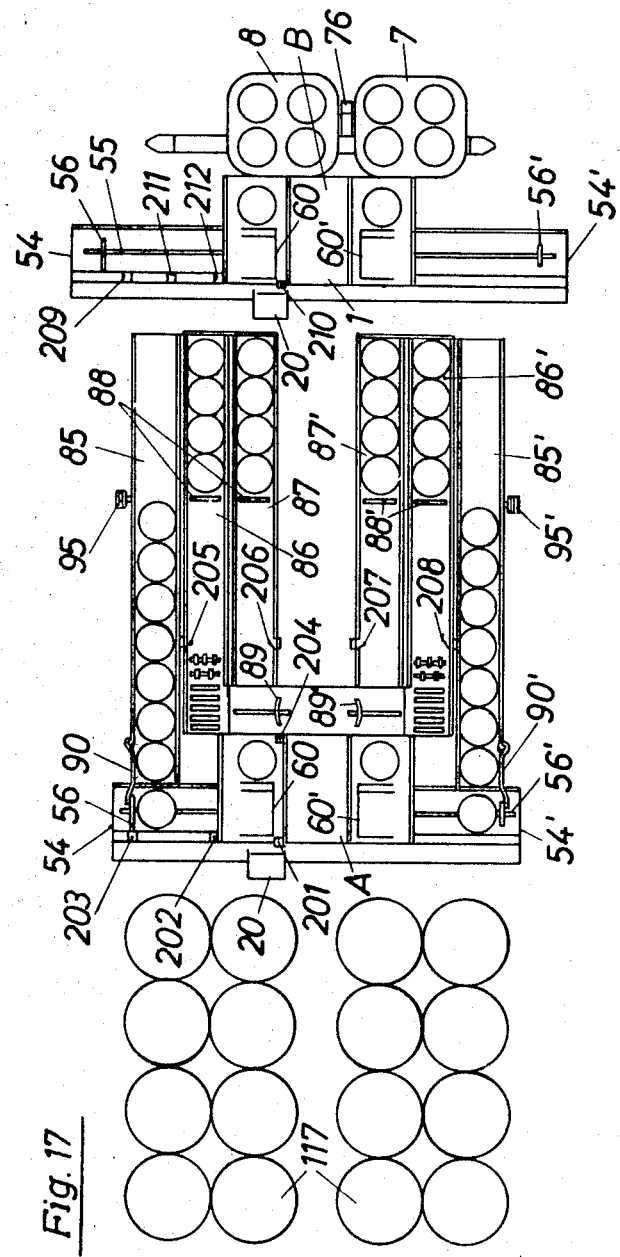

In another embodiment of the can changing apparatus of the invention, which is shown in FIG. 10 (see also FIG. 16, where a tandem operation employing two similarly outfitted drawing frames is shown), ramps 54 and 54' are placed at each side of the machine as a gathering point for the empty cans, instead of the can dollies 6 and 9. A number of empty cans can be placed simultaneously on this ramp—three for example—so that, together with an empty can that is already in the machine, at least four empty cans are available for the successive automatic changes. To guide the empty cans such as can 63, ramps 54 and 54' have two guide rails 57–58 and 57'–58', respectively (FIGS. 10 and 16). Pushing arms 56 and 56', which are driven by screws 22 and 22' mounted in a sheltered manner behind the machine in much the same way as the pushing arms 24 and 24' shown in FIGS. 1 to 6, emerge from slots 55 and 55', respectively. The exchanging of full cans 61 and 61' for empty cans is performed in the machine by means of forks 60 and 60', which have already been mentioned.

Can dollies 7 and 8, which, in contrast to the embodiment described above, are connected by a snap coupling 51 to a pulling member in the form of a toothed rack 64, serve to receive the full cans. As shown in FIG. 11, rack 64 is driven by a motor 65 mounted in the central drive box 1 of the drawing frame, through transmission gears 66, 67, 68, 69, and 70. The snap coupling 51 for can dollies 7 and 8 is shown in detail in FIGS. 12, 13, and 14.

Rack 64 is fastened by means of two screws 72 and 72' to the bottom of a carriage 71. At its two extremities rack 64 is provided with fingers 64' which can operate limit switches 213 and 214 fastened between the channel irons 75. Guiding rollers 73 and bearing rollers 74 are provided at the four corners of carriage 71. Bearing rollers 74 run in the channel irons 75 fastened to the floor in front of the machine, while the guiding rollers 73 bear against the upper edge of the channel irons and thus provide for lateral guidance of the carriage 71.

The hitching of the can dollies 7 and 8 to the snap coupling 51 is performed, as shown in FIG. 10, by passing the can dollies sidewise over the channel irons 75, so that the dollies are guided by the latter and their raised edges 7' and 8' encounter the elastic buffers 83 and 83', respectively. Catch pins 84 and 84' fastened to the underside of the can dollies thus encounter hasps 80 and 80', respectively, and depress them until catches 84 and 84' snap into holes 82 and 82' in hasps 80 and 80', respectively. When the catches engage, hasps 80 and 80', which can be pivoted downward elastically against springs 81 and 81', respectively, snap back up and the can dollies are hitched to the carriage 71.

The snap coupling 51 is released by depressing the pedal 76, whereupon the adjustable studs 79 and 79' fastened to the pedal, force the hasps 80 and 80' downward against the pressure of springs 81 and 81', thus releasing the catch pins 84 and 84', and both can dollies 7 and 8 are pushed away from carriage 71 by the pressure of elastic buffers 83 and 83', respectively.

This modified embodiment of the can changing apparatus represented in FIG. 10, and FIGS. 16–19 and FIG. 23 functions in the same manner as the embodiment described before. In this embodiment, however, the ramps 54 and 54' serve as slideways for the empty cans. The empty cans are brought up on can dollies and taken off the dollies and placed on ramps 54 and 54' which serve as the gathering points for empty sliver cans. The can dollies 7 and 8 are then hitched to the snap coupling 51 to serve as a gathering point for the full cans. At least three empty cans 63 are placed on each of the ramps 54 and 54', so that, including an empty can which is already in the ready position on each side of the machine, the machine is provided with four empty cans on each side. Ramps 54 and 54' can also be made long enough to accommodate four or more empty cans. After cans 61 and 61', located underneath the sliver output devices 2 and 2' of the drawing frame (FIG. 10) have been filled with the quantity of sliver determined by the counting mechanism 62, they are ejected by the forks 60 and 60', respectively, onto the can dollies 7 and 8. A switch 210 is operated by the returning forks 60 and 60', and motor 20 is energized, so that the three empty cans on ramp 54 (and those on ramp 54') are pushed by the pushing arms 56 and 56' in the direction of the machine. When the first of the three cans standing in readiness is far enough into the machine, the pushing arm 56 reaches a switch 209 (FIG. 16) which again shuts off the motor.

After the next ejection of a full can from the drawing frame, switch 210 gives the second command for the pushing arms 56 and 56' to operate, whereupon the next empty can is pushed into the machne. The movement of the pushing arms is halted by the switch 211, which simultaneously caused the advancement of can dollies 7 and 8, which in the meantime have been carrying two full cans, doing so by energizing motor 65 (FIG. 11). After the can dollies have been shifted, motor 65 is shut off by limit switch 213 or 214, which are operated by fingers 64' on rack 64 as soon as the can dolly is in its correct position.

In the next can change, the pushing arms 56 and 56' are once again actuated by the limit switch 210, whereupon the last of the three cans placed in readiness on ramp 54 is pushed into the machine. As soon as the can is sufficiently far into the machine, pushing arm 56 encounters a limit switch and shuts off motor 20. At the same time, limit switch 212 initiates the return movement of pusher arms 56 and 56' and reverses the polarity of motor 65. Motor 65 remains unenergized, however, since the reversal of its polarity serves only as a preparation for the filling of the next four cans, during which the two fresh can dollies hitched to the snap coupling must be displaced in the opposite direction.

The changing apparatus that has been described is suitable, with the same advantages, for use with other machines used in the preparation of roving than the drawing frames of German Patent 1,036,132; for example, it can be used in drawing frames with a plurality of outputs as in FIG. 9, and also on cards, combing machines and others.

FIG. 9 shows schematically, by way of example, a drawing frame in which two working stations are arranged on each side of the central drive box 1, so that the can dollies serving also a gathering point for the sliver cans can carry eight cans each. It is also possible to apply the invention advantageously to drawing frames having a drive box 1 disposed on one side only. Thus, in FIG. 9, the dollies 6 and 7 and associated parts could be dispensed with and the unit could be operated with only the dollies 8 and 9 and associated parts.

It is furthermore possible to use racks or hydraulically or pneumatically powered pistons to operate arms 24 or 56, rather than a screw. Instead of the special auxiliary motors 20 and 30 for producing the dolly and pushing-arm movements, an auxiliary shaft can be used that can be clutch-coupled to the constantly rotating main drive shaft of the machine.

Likewise, instead of coupling 44 or snap coupling 51, other appropriate entraining devices can be used for hitching the can dolly to the pulling member 31 or 64, such as magnetic coupling or the like.

In order still further to automatize the operation of the drawing of slivers, it is possible to arrange a plurality of drawing frames in tandem, each equipped with the system of the invention, so that the sliver cans that pass through the first drawing frame serve directly as the input to the second drawing frame, and the cans will continually circulate between two drawing frames.

Figure 15:
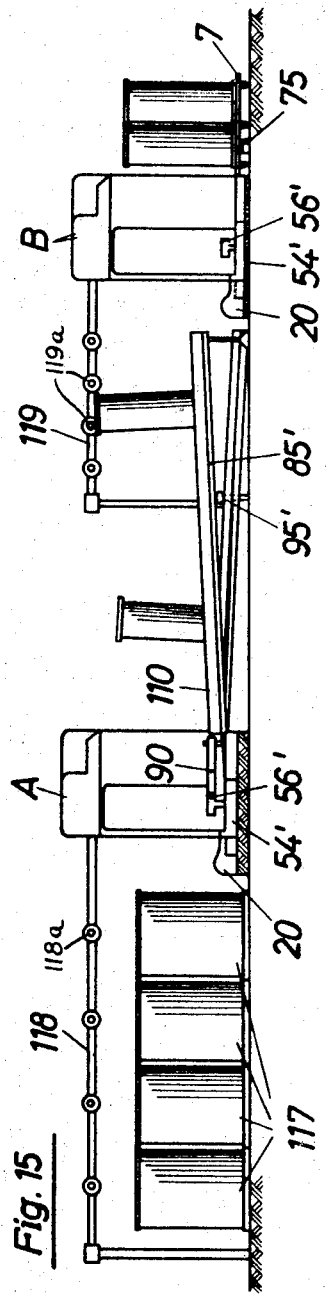
FIG. 15 shows in elevation an automatically operating can changing apparatus for two drawing frames connected in tandem.

FIG. 15 shows such a combination of two drawing frames equipped with the can changing apparatus of the invention, and operating as one unit with partially automatic sliver can circulation, in which a drawing frame B equipped with the can changing apparatus of the invention is preceded by a second drawing frame A equipped also with the can changing apparatus of the invention. Drawing frame A receives its input material from cans 117 by way of the sliver guide rack 118, having sliver guides 118a, while drawing frame B is supplied with material by way of sliver guide 119, having sliver guides 119a, from sliver cans placed on roller conveyors. The above-mentioned sliver guide racks do not appear in FIGS. 16 to 19 and 23.

Referring to the last-mentioned figures, roller conveyors 85–86–87 and 85'–86'–87' are disposed in parallel sets on either side of drawing frame A, conveyors 86–87 and 86'–87' being operated as pairs. The roller conveyors are disposed in the manner that they form ramps inclined for gravity operation of the conveyors. Roller conveyors 85 and 85' are return conveyors and are tilted in the direction of drawing frame A, so that all cans placed on it tend to move in the direction of arrow $P_4$. The conveyor pairs 86–87 and 86'–87' are tilted towards frame B, so that cans placed on them tend to move in the direction of arrow $P_5$. Conveyor pairs 86–87 and 86'–87' are divided by stops 88 and 88', respectively, into waiting station disposed adjacent the drawing frame A and an emptying station disposed adjacent the drawing frame B. Distributing pushers 89 and 89' at the output of drawing frame A distribute the full cans to both conveyors of pairs 86–87 and 86'–87', respectively.

Conveyors 85 and 85', parallelly associated with conveyor pairs 86–87 and 86'–87', respectively, for the return of the empty cans, have brakes 90 and 90', respectively, at their lower ends. The purpose of these brakes is to prevent cans from roller conveyors 85 and 85' from getting behind pushers 56 and 56' when the latter are moved out of their extreme end position against the machine frame for the purpose of pushing the next empty can in along the slideway toward the filling position. Brakes 90 and 90' hold back the empty cans on roller conveyors 85 and 85', respectively, until pushers 56 and 56' have regained their extreme end position. A blocking device of this type is shown in detail in FIGS. 24 and 25. A portion of the lateral margin 110 constructed as a brake is mounted pivotally and connected through a lever 111 mounted underneath the roller conveyor to a tension spring 112 which pivots brakes 90 or 90' into the roller conveyor as soon as they are no longer held back by pushers 56 and 56'. In this manner, the cans on the roller conveyor are held fast until pushers 56 and 56', upon returning to their end position, encounter the extension 113 of brakes 90 and 90' and thereby swing the brake out of the roller conveyor against the tension of spring 112. In this situation the roller conveyor is again released and the next cans are able to roll unhampered in front of pushers 56 and 56'. A stop 114 prevents brakes 90 and 90' from swinging too far if there should be no can to be held, thus getting out of the reach of the pushing arms 56 and 56'.

Figure 20:
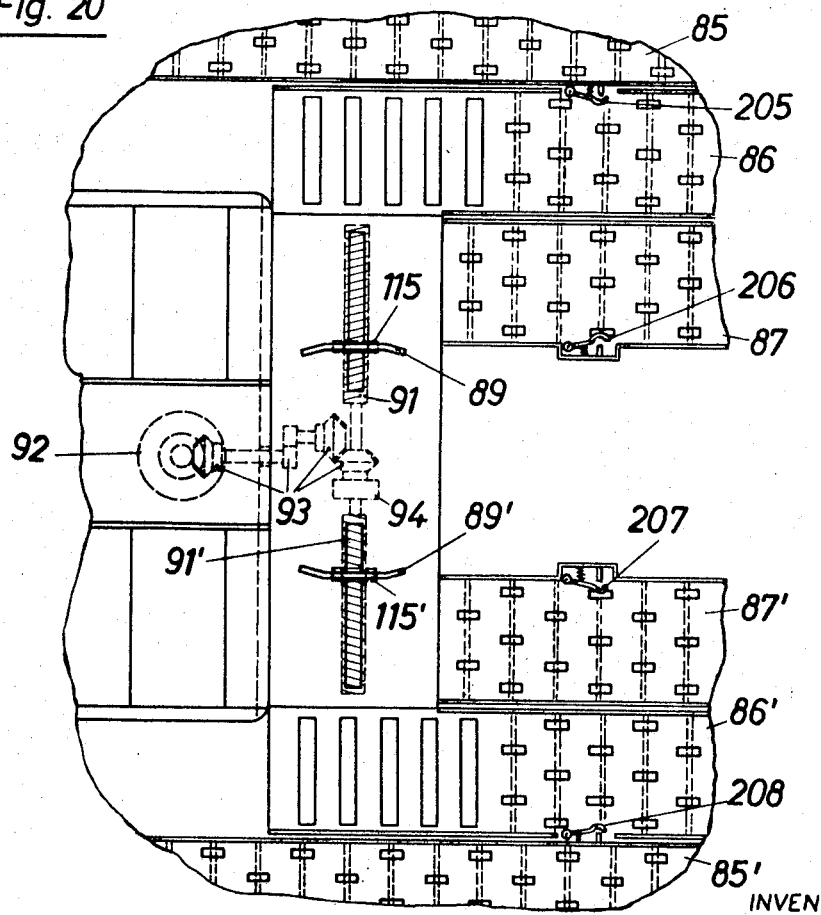
FIG. 20 is a detail from FIG. 16, showing in plan a part of the can handling apparatus of drawing frame A.

In FIG. 20 is shown the driving mechanism of the distributing pushers 89 and 89'. As in the case of the two pushing arms 56 and 56', the two distributing pushers 89 and 89', which are affixed to the nuts 115 and 115', respectively, are moved by screws 91 and 91', respectively. Screws 91 and 91' are driven by a motor 92 located in drive box 1 of the drawing frame, through a transmission 93 and a safety clutch 94.

Figure 22:
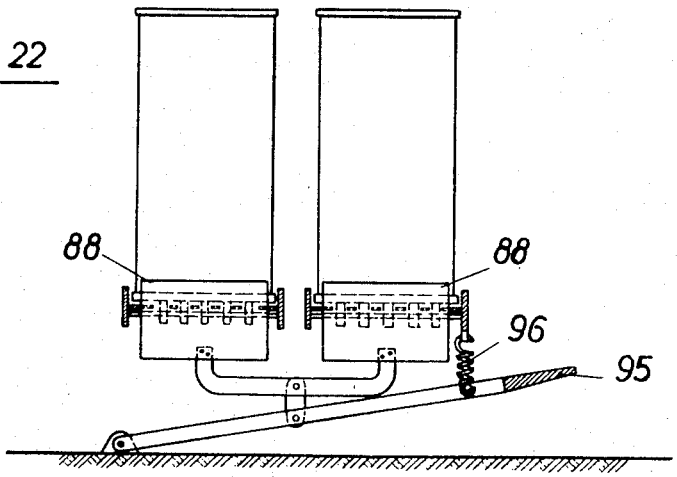
FIG. 22 shows a filled can stopping device disposed on the roller conveyors intermediate the drawing stations shown in FIG. 16.

FIG. 22 shows the stops 88 which divide roller conveyors 86 and 87. Stops 88 are passed through slots created in the roller conveyor into the path of the cans, and they can be withdrawn by means of pedal 95 against the tension of spring 96.

The transfer of the cans from drawing frame A to drawing frame B is performed in the manner indicated in FIGS. 16 to 19.

Figure 18:
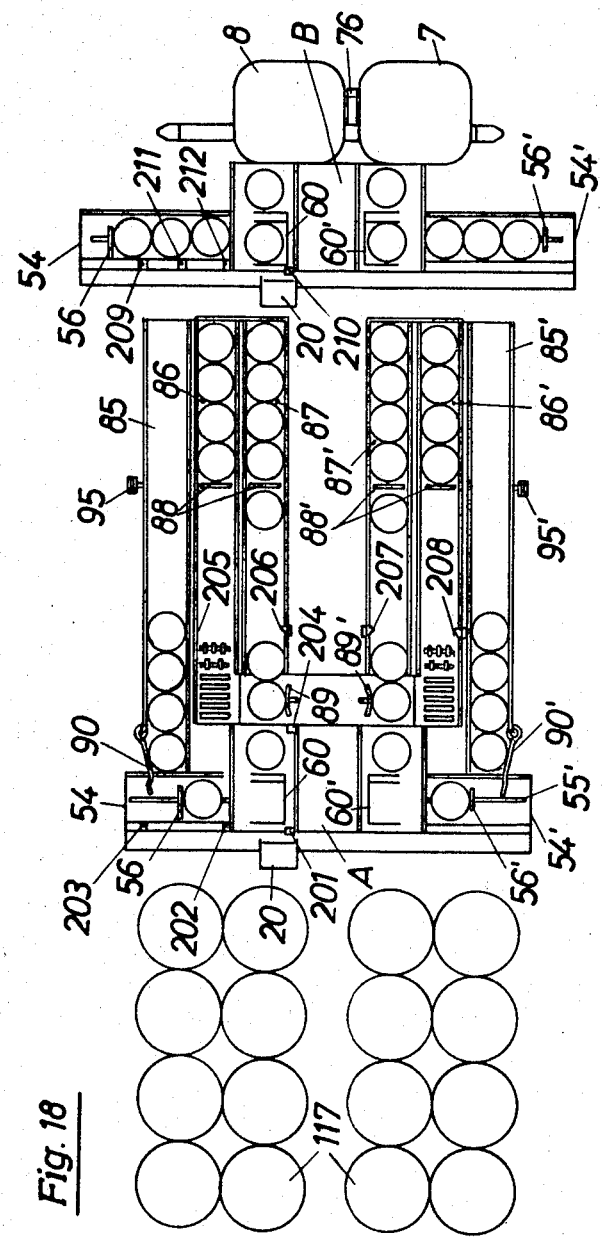
Figure 19:
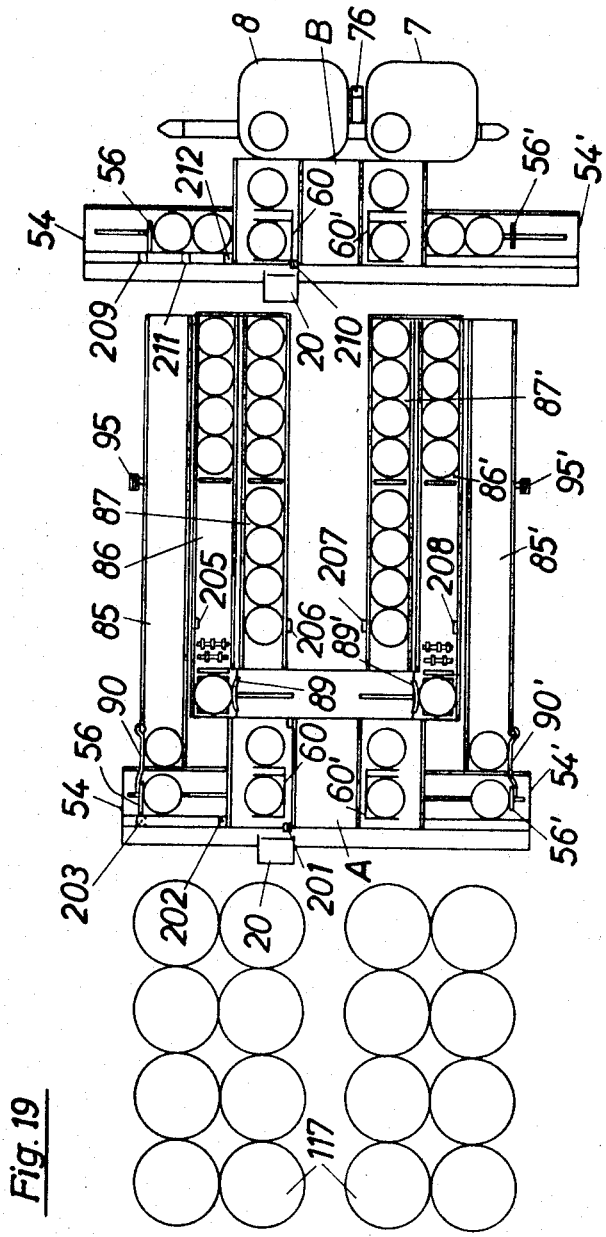

When forks 60 and 60' have ejected filled cans from drawing frame A, they return to their position of rest and operate a limit switch 201. The limit switch 201 starts the motor 20 that drives screw 22 and thus moves the pushers 56 and 56'. Thereupon, on both sides of the machine, one of the cans carried by each of roller conveyors 85 and 85' is pushed into the drawing frame (FIG. 18). At the end of this insertion, pusher 56 encounters another limit switch 202 which reverses motor 20 so that it rotates in the opposite direction. Pushers 56 and 56' are thereby moved back to their starting position, while the empty can remains in the ready position in the drawing frame. As soon as pushers 56 and 56' return to their original position, they operate a limit switch 203 by which motor 20 is shut off.

This process is repeated until the eight empty cans in the ready position on roller conveyor 85 have been pushed successively into the drawing frame and filled. After there are no longer any more empty cans at the entrance to the drawing frame, the machine is automatically shut off by a program switching mechanism (not shown) which can be actuated by the movement of the arms 90 and 90' across the conveyors 85, 85', and thus the opportunity is created for preparing some more empty cans on roller conveyor 85 or for transferring the cans which in the meantime have been emptied into drawing frame B from roller conveyor pairs 86–87 and 86'–87' to their associated return conveyors 85 and 85'.

The eight cans successively filled in a continuous operation at each working station of drawing frame A must be distributed four to each of the two roller conveyors associated with that station (FIG. 16). To this end, distributing pushers 89 and 89' are provided, which are set in movement by motor 92 controlled by a program switching mechanism of the prior art. This can be done in two different ways.

In the first method, filled cans from the working stations of drawing frame A are first fed by the forks 60, 60' and gravity, respectively, to conveyors 87 and 87' until four filled cans have been delivered to each of these conveyors. Thereupon, the pushers 89, 89' are placed in operation so that the filled cans from the two working stations are fed respectively to conveyors 86, 86'. Thus, program switch 204 receives, after each can ejection brought about by forks 60 and 60' (drawing frame A), an impulse which rotates it by 45°. After four impulses, corresponding to four full cans ejected from each of the two working stations of the machine, the program switch completes half of a revolution and closes a contact. This contact now forwards to motor 92 (FIG. 20) the impulse produced by limit switch 201 which starts the insertion of empty cans by pushers 56 and 56'. In this manner, the full cans ejected from the machine are pushed by distributing pushers 89 and 89' onto the roller conveyors 86 and 86', respectively, which are disposed parallel to roller conveyors 87 and 87'. After four full cans have been pushed onto each of roller conveyors 86 and 86', the program switching mechanism has performed a full revolution, whereupon the machine is automatically shut off.

The cans on the bottom half of roller conveyor pairs 86–87 and 86'–87', which have served to feed material into drawing frame B and in the meantime have run empty, are now transferred by hand to return conveyors 85 and 85', and are thus fed back as empties to drawing frame A (FIG. 16). By operating the pedals 95 and 95', the full cans that are on the upper half of the roller conveyor pairs (FIG. 16) roll down towards the drawing frame B (FIG. 17), where they then serve to feed the sliver to the latter. Both drawing frames A and B are now placed into operation again, and the above-described procedure is repeated.

The second way of supplying the two roller conveyor pairs 86–87 and 86'–87' uniformly with full cans consists in adjusting the program switching mechanism in such a manner that one can is distributed to first one and then the other of the two roller conveyors associated with a working station. As soon as the portions of roller conveyor pairs 86–87 and 86'–87' located above the stops 88 and 88', respectively, are occupied by four cans each, four limit switches 205, 206, 207 and 208 are operated, whereupon drawing frame A ceases to operate.

In the above-described embodiment of the invention, two drawing frames A and B are associated in tandem with one another having two heads and two outputs each. Whereas the full cans are transported over roller conveyors from drawing frame A to drawing frame B and are returned as empties to drawing frame A, drawing frame B receives its empty cans from can dollies, or from feeding ramp 54, 54'. Dollies 7 and 8 receive full cans in front of drawing frame B.

The process of FIGS. 16–19 has been described in detail in connection with the embodiment of FIG. 10.

Of course, it is possible to have drawing frame B followed by another drawing operation, so that drawing frame B and a similar drawing frame work together in the same manner as drawing frames A and B.

Conveyor belts or other appropriate transporting means can also be used instead of roller conveyors.

As shown by way of example in FIG. 23, the apparatus of the invention is not restricted to drawing frames having two heads or two outputs each, but can be used with drawings frames having a larger number of outputs. The drawing frames A' and B' shown in FIG. 23 have two working stations, for example, on each side of drive box 1. The filled cans are discharged from these working stations of drawing frame A' directly onto roller conveyors 101, 102, 101' and 102'. In contrast to the embodiment in FIGS. 15 to 19, the distributing pushers 89 and 89' for distributing the cans to the different roller conveyors can be eliminated, along with the program switching mechanism corresponding thereto. After the full cans ejected onto roller conveyors 101, 102, 101' and 102' have been emptied, they are transferred by hand, as already described, to roller conveyors 103, 104, 103' and 104', respectively, whereupon the lowering of stops 88 and 88' permits the full cans on roller conveyors 101, 102, 101' and 102' to roll from drawing frame A' to the input side of drawing frame B'. The empty cans are fed back to drawing frame A' on the roller conveyors 103, 104, 103' and 104', which are inclined towards drawing frame A', whereupon two empty cans are inserted into the machine on each side by pushers 56 and 56'. Brakes 90, 116, 90' and 116', are provided on roller conveyors 103, 104, 103' and 104', respectively, these brakes being coupled with one another; brakes 90 and 90' on the outer roller conveyors 104 and 104', respectively, have extensions which cooperate in the manner previously described with the pushers 56 and 56' in order to prevent the cans on conveyors 103, 104, 103' and 104' from rolling when the pushers operate.

Also in the case of this embodiment, variations are possible: for example, additional drawing frames can be arranged in tandem, or conveyor belts or other appropriate transporting means can be used instead of roller conveyors. Likewise, instead of the feeding ramps on drawing frame B', appropriate vehicles can be used directly as gathering points for the empty cans, as described in the case of the first embodiment of the invention.

In the embodiment shown in FIG. 26, two drawing frames are used in tandem. Slivers are supplied to the cans 126, which are disposed in the filling stations, by drawing mechanism 120, the direction of movement of the filaments being that indicated by the arrow 120a. Mover means in the form of displacement fork 56, in the position shown in the drawing, has just transferred the cans 126 from the ready stations indicated by the reference number 123, to the filling stations. When the displacement fork 56 returns from the filling stations, the spring loaded catches 90 will be tripped by the displacement fork and then two empty can from among cans 121 in the collecting station for empty cans, which is composed of the inclined ramps 103, 104, will slide into the ready stations. Mover means in the form of pushers 60 displace cans 126, after they have been filled, to the roller conveyors 101, 102 and the cans then pass by gravity to the collecting station for filled cans located to the right of the stops 88, on the ramps or roller conveyors 101, 102. The cans 126a disposed between the stops 88 and the drawing mechanism 131 of the second drawing frame which comprises the drawing mechanism 131, are emptied by transfer of the slivers to the cans 135. The drawing mechanism 131 moves the fibers from the cans in the direction indicated by the arrow 131a. The resulting empty cans are transferred by hand to the inclined ramps or roller conveyors 103, 104. By releasing the stop 88 by means of foot pedal 95, the filled cans roll from the collecting station for filled cans, located to the right of the stops 88, to the emptying station, located to the left of the stops 88. The empty cans are transferred from the collecting station for empty cans, which is provided by the inclined ramps 103, 104, to the ready stations 123, by movement over the inclined ramps in a direction parallel to the direction of the fiber travel; from the ready stations 123 to the filling stations, laterally to the fiber travel direction; and from the filling stations to the collecting station or filled cans, again parallel to the fiber travel direction.

In the drawing station comprising the drawing mechanism 131, the mover in the form of displacement fork 136 simultaneously slides two filled cans 135 from the filling stations into the collecting station for filled cans in the form of platform 7, and two empty cans 134 from the ready stations to the filling stations. Here the filled cans 135 are slid laterally to the fiber travel direction to the collecting station for filled cans.

In the embodiment of FIG. 27, empty cans 138 slide on roller conveyor 139, which serves as the collecting station for empty cans, directly to the filling station of the drawing frame comprising the drawing mechanism 142 the direction of movement of the filaments being that indicated by arrow 142a. Thus, in this embodiment, no ready station is necessary. The filled can 141 is slid by the displacement arm 143 from the filling station onto the roller conveyor 87 and slides to the collecting station for filled cans which is disposed on the roller conveyor to the right of the stop 88.

Thus, the invention provides apparatus for depositing of strand material in cans or the like, the apparatus comprising: (a) a filling station adapted to receive a can for filling thereof; (b) a first mover means for moving a filled can from the filling station; (c) a slideway disposed laterally of the direction of movement of the filled can upon removal thereof from the filling station, and for delivery of empty cans to the drawing frame; (d) a second mover means for sliding empty cans along the slideway toward the filling position and for delivery to the filling position; (e) and control means responsive to operation of the mover means which remove filled cans from the filling station, and which is effective to actuate the mover means for sliding cans along said slideway.

The apparatus can include a ready station for an empty can destined for the filling station, positioned to receive an empty can from the slideway for delivery to the filling station. The direction of movement of an empty can from the ready station to the filling station is preferably in the direction of movement of a filled can from the filling station upon its removal therefrom.

An empty can platform, in the form of a dolly or the like, can be utilized for holding empty cans for the slideway. Preferably, the empty can platform is movable between a first position wherein at least one can resting thereon is in the slideway, and the second position wherein at least one can resting thereon is in the slideway. Upon the clearing of the slideway of empty cans, control means sense this condition and thereupon move the platform to its second position, whereby additional empty cans are placed in the slideway. The second mover means, which is the mover means for advancing cans over the slideway, can include an arm for engaging the cans and moving them along the slideway. Said arm can be mounted on a shaft disposed between the source of strand material delivered to the apparatus and the filling station, and this shaft is preferably vertically spaced from the empty can platform, so that upon moving the platform from its first position to its second position, the platform moves under the shaft to the extent that the platform situs of cans for said first position underlies the shaft. Operation in this manner permits a compact and convenient arrangement for the apparatus, while at the same time interference between the shaft and empty cans is anticipated.

The invention also provides a filled can platform disposed for receiving filled cans upon movement of the filled cans from the filling station by the first mover means. The platform is preferably a dolly, and means are provided for moving it between a first position, wherein a first portion thereof is disposed for receiving cans from the filling station, and a second position wherein a second portion thereof is disposed for receiving cans from the filling station.

When utilizing an empty can platform and a filled can platform as described above, the apparatus can include an endless cable drive means disposed about the base of the fixed platform whereon the filling station is located. Connector means are provided for interconnecting the cable with the empty can platform and with the filled can platform, so that each of these platforms can be moved from its first position to its second position by operation of the cable. Means are provided for actuating the cable to provide such movement, so that the empty can platform can be moved from its first position to its second position to maintain a supply of empty cans on the slideway, and so that the filled can platform can be moved from its first position to its second position to provide platform area for receipt of filled cans from the filling station. Control means are provided so that the described movement of the cable drive occurs in response to operation of the apparatus to remove filled cans from the filling station. Thus, in the case of the use of dollies as the platform, the dollies being of a size to accommodate two cans across the width thereof, upon the movement of two cans from the filling station and two cans from the slideway, the dollies can be moved to, respectively, provide two additional empty cans on the slideway and to provide a free area on the dolly for receipt of additional filled cans.

In a preferred embodiment of the invention, two filling stations are disposed side by side and operate simultaneously. For such operation, each filling station can be provided with a slideway for delivery of empty cans to the device, and an empty can platform or dolly can be utilized for delivering empty cans to the slideway. Similarly, each filling station can be provided with a filled can platform. For such an embodiment, each of the empty can and filled can platforms can be joined to an endless cable drive as is described above. The filled can platforms will be movable laterally of the direction of movement of the filled cans upon removal thereof from the filling station, the empty can platforms will be movable in a direction opposed to the direction of movement of the filled cans from the filling stations. Thus, one of the empty can platforms can be connected to the endless cable drive to move in the direction of movement of the cable drive, whereas the other of the empty can platforms is connected to the cable drive so as to move in a direction in opposition to the movement of the cable drive. This connection to provide opposed motion can be obtained by utilizing a reversing means for transferring motion of the cable drive to the empty can platform.

Instead of utilizing an empty can platform for supplying empty cans to the slideway, a fixedly positioned ramp can be disposed along the slideway, so that as many empty cans as are desired can be positioned on the ramp for movement thereover to the filling station by operation of the empty can mover means. In this embodiment, dollies are preferably used as the filled can platforms. For movement of the dollies to provide free area for receipt of filled cans, any suitable means can be used to shift the dollies in a suitable manner. In a preferred embodiment, the means for shifting the dollies is a rack slide on which the empty can platform or platforms can be releasably secured for movement therewith. As in the case where an endless cable is utilized for actuating the platforms, suitable control means can be used for response to operation of the filling stations to move the filled can platforms in the manner desired.

The apparatus of the invention advantageously includes a first and second drawing frame operated in tandem. Each of the drawing frames comprises filling station, means for removing filled cans from the filling station and means for supplying empty cans to replace the filled cans removed. The empty cans are provided from a slideway on which they can be retained until needed, and mover means synchronized with the filled can removal means are provided for movement of empty cans over the slideway.

For the tandem apparatus, the strand material treated in the first drawing frame is further treated in the second drawing frame and the strand material fed to the second drawing frame is withdrawn from filled cans which were filled at the first drawing frame. According to the invention, intermediate the first drawing frame and the second drawing frame, there is provided a filled can emptying station wherefrom strand material is withdrawn from filled containers and fed to the second drawing frame. Further, there is provided a waiting station or collecting station for filled cans intermediate the drawing frames, and filled cans from the first drawing frame are retained at the waiting station until needed for use at the emptying station.

Conveyor means are provided for transferring filled containers from the first drawing frame to the waiting station and from the waiting station to the emptying station. The conveyor means can be an inclined conveyor disposed for movement of filled cans thereover in the direction of the second drawing frame under the influence of gravity, and the waiting station can comprise a portion of the conveyor adjacent the first drawing station, while the emptying station can comprise a portion of the conveyor adjacent the second drawing station. It will be observed that the conveyors 86 and 87 each provide a conveyor means to the waiting station and a conveyor means to the can emptying station. Stop means are provided for dividing the waiting station from the emptying station, and the stop means can be in the form of abutments on which the filled containers in waiting zone press. The stop means is movable so as to remove the abutment from the path of the filled containers along the conveyors and permit travel of the container under influence of gravity from the waiting zone to the emptying zone.

Following the emptying of containers utilized in the emptying station for supplying strand material to the second drawing frame, the emptied containers can be removed manually from this area. Desirably, a return conveyor is provided for return of these empty cans to the first drawing frame. This return conveyor can be an inclined conveyor adapted to permit passage of the empty containers thereover under influence of gravity, and can convey the empty containers to the slideway provided for feeding of empty cans to the filling station of the first drawing frame.

In tandem operation, it is desirable to provide two rows of cans aligned in the direction of travel of the strand material to the first drawing frame, and accordingly, it is desirable to provide two ramps for the waiting and emptying zones. To facilitate such construction, the device of the invention further includes distributing means for distributing filled containers from the filling station of the first drawing frame between the two ramps. One of the ramps can be aligned with the filling station of the first drawing frame so that upon removal of a filled container therefrom, the container moves under influence of gravity into the entranceway of this ramp. To provide for the delivery of the filled containers to the other ramp, a pusher arm operates to move the cans to the entranceway of the ramp not aligned with the direction of movement of the filled cans as they move away from the filling station. Control means can be provided so that the pusher arm is inactive until the ramp aligned with the direction of movement of the filled can receives a predetermined number of filled cans. The control means then operate to place the pusher arm in operatiton so that upon removal of each filled can, the pusher arm moves it to the entranceway to the other ramp.

The slideway for supplying empty cans to the second drawing frame, and the means for receiving filled cans from the second drawing frame, can be as is described above with reference to the invention wherein the apparatus is utilized in operation of a single drawing frame.

While the invention has been described with reference to particular embodiments thereof, various modifications and alternatives will be apparent to those skilled in the art, and it is desired to secure by these Letters Patent all such embodiments as are within the scope of the appended claims.

What is claimed is:

1. Apparatus for depositing strand material in cans comprising:
    (a) means providing a filling station adapted to receive a can for the filling thereof;
    (b) a filling device for receiving strand material and directing it into the cans;
    (c) strand supply means for supplying strand material to the filling device from a locus horizontally spaced from the filling station;
    (d) means providing a ready station for an empty can destined for the filling station disposed between the filling station and the strand supply means;
    (e) a first mover means for moving a filled can from the filling statiton and an empty can from the ready station in the direction of travel of strand material of the direction of travel of strand material to the filling station with an empty can from the ready station;
    (f) a slideway for empty cans leading to the ready station and extending from the ready station laterally of the directiton of travel of strand material to the filling device;
    (g) second mover means for sliding empty cans along the slideway to move an empty can to the ready station to replace can moved from the ready station to the filling station;
    (h) and drive means for said second mover means;
    (i) control means responsive to operation of the first mover means and effective to actuate the drive means for the second mover means for operation thereof as aforesaid.

2. Apparatus according to claim 1, and including an empty can platform for holding empty cans for delivery to said ready station, portions of said empty can platform serving as said slideway, said empty can platform being movable between a first position wherein at least one can resting thereon is in said slideway, and a second position wherein at least one can resting thereon is in said slideway, means for sensing delivery of all cans from said slideway with the empty can platform in said first position, and empty can platform control means responsive to said sensing means to thereupon move said empty can platform to said second position.

3. Apparatus according to claim 2, said second mover means comprising an arm for engaging the cans and moving them along the slideway, a shaft having said arm mounted thereon, said shaft being between the strand material supply means and the ready station and being vertically spaced from the said empty can platform, said empty can platform upon moving from said first position to said second position, moving under said shaft so that the platform situs of cans for said first position underlies said shaft.

4. Apparatus according to claim 3, said first mover means moving the filled cans in said direction of travel of the strand, and a filled can platform disposed for receiving filled cans upon movement thereof from the filling station by said first mover means, means for moving said filled can platform between a first position wherein a first portion thereof is disposed for receiving cans from the filling station and a second position wherein a second portion thereof is disposed for receiving cans from the filling station.

5. Apparatus according to claim 4, said filling station and said ready station being located on a fixed platform, an endless cable drive means disposed about said fixed platform, connector means interconnecting said cable with said empty can platform and said filled can platform for movement of each the empty can platform and the filled can platform between its first and second position in response to movement of the cable drive means and means for actuating the cable drive means to provide such movement of the empty can platform and the filled can platform, whereby the empty can platform can be moved from said first position to said second position to maintain a supply of empty cans on said slideway, and the filled can platform can be moved from said first position to said second position to provide platform area for receipt of filled cans from the filling station.

6. Apparatus for depositing strand material in cans comprising:
    (a) means providing two filling stations disposed side by side and each adapted to receive a can for filling;
    (b) a filling device for each filling station for receiving strand material and directing it into the can;
    (c) strand supply means for supplying strand material to each of the filling devices from a locus horizontally spaced from the filling stations;

(d) means providing a ready station for each filling station and for an empty can destined for its filling station, each ready station being disposed between its filling station and the strand supply means;

(e) each filling station having a first mover means for moving a filled can from the filling station and an empty can from the ready station in the direction of travel of strand material to the filling device to displace the filled can at the filling station with an empty can from the ready station;

(f) each of the filling stations and its ready station having a slideway for empty cans leading to the ready station and extending from the ready station laterally of the direction of travel of strand material to the filling device;

(g) each slideway having a second mover means for sliding empty cans along the slideway to move an empty can to its ready station to replace an empty can moved from the ready station to its filling station;

(h) drive means for each of said second mover means;

(i) control means responsive to operation of each of the first mover means and effective to actuate the corresponding drive means for operation of its second mover means as aforesaid.

7. Apparatus according to claim 6, and including an empty can platform for each of the ready stations, portions of said empty can platform serving as said slideway, said empty can platform for each station being disposed laterally of said direction of travel of strand material and being movable between a first position to provide a can resting thereon in said slideway and a second position to provide another can resting thereon in said slideway, and empty can platform mover means for simultaneously moving each of the empty can platforms between its first position and its second position.

8. Apparatus according to claim 7, said second mover means for each of the slideways comprising an arm for engaging a can and moving it along the slideway toward the ready station, shaft means disposed between the strand material supply means and the ready stations, said arms being mounted on the shaft means, said platforms when in said second position being disposed beneath the shaft means with the shaft means overlying the platform situs of cans for said first position of the empty can platform.

9. Apparatus according to claim 8, and including for each filling station, a filled can platform for receiving filled cans from its filling station, said filled can platform being movable between a first position wherein one portion thereof is disposed for receiving filled cans and a second position wherein another portion thereof is disposed for receiving filled cans.

10. Apparatus according to claim 9, the said filling stations and ready stations being disposed on a fixed platform, an endless cable drive mounted on said fixed platform, interconnecting means interconnecting each of the said empty can platforms and the filled can platforms with said cable drive for movement of said platforms between their respective first and second positions in response to movement of the cable drive, one of said empty can platforms moving in the direction opposed to said direction of travel of strand material and in the direction of cable drive movement, the other of said empty can platforms moving in the direction opposed to said direction of travel of strand material and also opposed to the direction of cable movement, the interconnecting means for the empty can platform moving in the direction opposed to the direction of the cable drive movement including a reversing means for moving the empty can platform in a direction opposed to the direction of the cable drive movement, and means for actuating the cable drive to simultaneously move the platforms from the first positions to the second positions to maintain a supply of empty cans from the empty can platforms for the slideways to the ready stations and to provide area on the filled can platforms for receiving filled cans from the filling stations.

11. Apparatus according to claim 1, said slideway comprising a fixedly positioned ramp for holding empty cans and over which empty cans can be moved by said second mover means toward the ready station for receipt in the ready station.

12. Apparatus according to claim 1, and comprising a filled can platform for receiving filled cans moved from the filling station by said first mover means, the path of can movement from the filling station to the filled can platform being in said direction of travel of strand material, a rack slide disposed laterally of said direction of travel of strand material and for moving said filled can platform laterally of said direction to provide unfilled area of the platform in position for receipt of filled cans from the filling station, and means for selectively connecting together and releasing the filled can platform and the rack slide.

13. Apparatus according to claim 11, and including a filled can platform disposed for receiving filled cans from the filling station upon movement of the filled cans in response to action of said first mover means, in the direction of travel of the strand, said filled can platform being movable laterally of said direction of travel of strand material to provide area thereof free of cans for receipt of filled cans from the filling station, a rack slide for imparting said lateral movement to the filled can platform, and means for connecting together and disconnecting the filled can platform and the rack slide.

14. Apparatus according to claim 6, each of said slideways comprising a fixedly positioned ramp, said ramps being adapted for movement of empty cans thereover toward the ready stations in response to the operation of said second mover means, a filled can platform for each of the filling stations disposed for receiving filled cans moved from the filling station in said direction of travel of strand material in response to operation of said first mover means, a rack slide having said filled can platforms mounted thereon for movement thereof with the rack slide, said rack slide being movable laterally of said direction of travel of strand material for movement of said filled can platforms laterally of said direction of travel of strand material to provide open area of the filled can platform for receipt of filled cans from the filling stations, and control means for actuating the rack slide for movement of the filled can platforms as aforesaid, and sensing means responsive to operation of the second mover means and effective to actuate said control means.

15. Apparatus according to claim 6, each of said slideways comprising a fixedly positioned ramp, said ramps being adapted for the movement thereover of empty cans toward the ready positions in response to operation of said second mover means, and a filled can platform for each of said filling stations disposed for receiving filled cans from its filling station upon movement of a filled can from its filling station by said first mover means in the said direction of travel of strand material, platform mover means for moving said filled can platforms together laterally of said direction of travel of strand material for providing free area on each of said platforms for receipt of filled cans from its filling station, and control means for actuating the platform mover means for moving said filled can platforms as aforesaid in response to the filling of area on said platforms in position for receiving filled cans from the filled can stations, to provide free area on said platforms in position for receiving filled cans from said filled can stations.

16. Apparatus for depositing strand material in cans at a first drawing frame, said apparatus comprising:

(a) means providing a filling station adapted to receive a can for filling thereof;

(b) a filling device for receiving strand material and directing it into the cans;

(c) strand supply means for supplying strand material to the filling device from a locus horizontally spaced from the filling station;
(d) means providing a ready station for an empty can destined for the filling station;
(e) a first mover means for moving a filled can from the filling station and an empty can from the ready station to displace the filled can from filling station and replace it with an empty can from the ready station;
(f) an empty can collecting station comprising a slideway for empty cans for transfer of the cans from the collecting station to the ready station;
(g) second mover means for sliding empty cans along the slideway to move an empty can from the empty can collecting station to the ready station to replace can moved from the ready station to the filling station;
(h) and drive means for second mover means;
(i) control means responsive to operation of the first mover means and effective to actuate the drive means for the second mover means for operation thereof as aforesaid.

17. Apparatus for receiving strand material in cans delivered from a first drawing frame and supplying drawn strand material in the resulting filled cans to a following drawing frame, said apparatus comprising:
(a) a first drawing frame having a filling station adapted to receive a can for the filling thereof, a first mover means for moving a filled can from the filling station and to displace the filled can from the filling station, a ready station for receiving an empty can destined for the filling station upon movement of a filled can from the filling station, said ready station being disposed in the line of direction of movement of a filled can upon movement thereof from the filling station, a slideway for empty cans extending laterally of the direction of travel of the filled cans moved from the filling stations by said first mover means and for supplying empty cans to the ready station to replace empty cans removed therefrom, second mover means for moving empty cans along the slideway for delivery thereof to the ready station, control means responsive to operation of the first mover means and effective to actuate said second mover means for operation thereof as aforesaid;
(b) means providing a waiting station for receiving filled cans from the first drawing frame filling station and conveyor means conveying said cans to the waiting station;
(c) means providing a can emptying station and conveyor means for conveying filled cans accumulated at the waiting station to can emptying station adjacent the said following drawing frame;
(d) said conveying means to the waiting station and to the filled can emptying station being two parallel disposed ramps inclined for gravity movement thereover of filled cans, a portion of said ramps adjacent the first drawing frame serving as said waiting station and a portion of said inclined ramps adjacent said second drawing frame serving as said filled can emptying station at the following drawing frame, stop means positioned intermediate said inclined ramps and dividing the waiting station from the emptying station, said stop means being movable to permit movement under influence of gravity of filled cans from the waiting station to the emptying station, and filled can distributing means for receiving filled cans from said first drawing frame and distributing them between the two ramps.

18. Apparatus according to claim 17, said distributor means including a platform for receiving filled cans discharged from the filling station, and a pusher arm for selective operation to move a filled can to the receiving end of one of said ramps.

19. Apparatus according to claim 17, said distributing means comprising a platform for receiving cans discharged from the filling station, one of said ramps having its can receiving end in communication with said platform for receipt of a filled can from said platform, and a pusher arm for pushing a filled can on said platform to the entrance end of the second ramp, and means for actuating said pusher arm when the waiting station area of said first-mentioned ramp has received a predetermined number of filled cans, to operate the pusher arm to deliver cans subsequently removed from the filling station to the entrance end of the second-mentioned ramp.

20. Apparatus according to claim 17, and including a return ramp inclined for gravity flow of empty cans from adjacent the second drawing frame to the slideway of the first drawing frame.

21. Apparatus according to claim 20, the slideway of the first drawing frame being a fixedly positioned ramp, a pusher arm for pushing empty cans over the said fixedly positioned ramp laterally of the direction of movement of filled cans from the filling station, and toward the ready station for delivery thereto, said arm in the movement of cans along the slideway ramp moving from a rear position forward toward the ready station and following movement toward the ready station for delivery of an empty can thereto, being returned to its rear position, the return ramp being connected to the slideway ramp so that an empty can tends to move to the slideway ramp in a position forward of the rear position of said arm, and brake means for arresting travel of empty cans from the return ramp to the slideway ramp when the slideway pusher arm is forward of its rear position, said brake means being actuated by said pusher arm.

22. Apparatus according to claim 17, the said slideway of said first drawing frame being a fixedly positioned slideway.

23. Apparatus for depositing strand material in cans at a first drawing frame, supplying drawn strand material in the resulting filled cans to a second drawing frame for withdrawal of the strand material therefrom, and returning the resulting empty cans to the first drawing frame, comprising:
(a) a first drawing frame having a filling station adapted to receive a can for the filling thereof, and a filled can mover means for moving a filled can from the filling station to displace the filled can from the filling station;
(b) empty can supply means for supplying empty cans to the first drawing frame including an inclined ramp inclined for gravity movement of empty cans toward the first drawing frame, an empty can delivery means for delivery of empty cans from the inclined ramp to the drawing frame;
(c) control means responsive to operation of the filled can mover means and effective to actuate said empty can delivery means for operation thereof as aforesaid;
(d) filled can delivery means for delivering filled cans from the first drawing frame to the second drawing frame for emptying of the filled cans at the second drawing frame, including an inclined ramp inclined for gravity movement of filled cans from the first drawing frame to the second drawing frame, said ramp having a selectively releasable stop means positioned intermedate its ends and dividing the ramp to provide a waiting station portion of the ramp disposed adjacent the first drawing frame and a can emptying station portion of the ramp disposed adjacent the second drawing frame, said stop means being for interrupting travel of filled cans over the inclined ramp to retain filled cans at the waiting station portion, and being releasable to permit passage of filled cans retained at the waiting station portion to the emptying station portion;

(e) said inclined ramp of the empty can supply means being disposed substantially parallel to the inclined ramp of the filled can delivery means and extending from adjacent the first drawing frame to adjacent the emptying station station of the inclined ramp of the filled can delivery means.

24. Apparatus according to claim 23, said empty can delivery means comprising a slideway for receiving empty cans from the inclined ramp of the empty can supply means and transfer thereof to the first drawing frame, a mover means for sliding empty cans along the slideway comprising a pusher arm, said arm being moveable from a rear position on said slideway therealong toward the first drawing frame to push empty cans toward the first drawing frame, the inclined ramp of the empty can supply means connecting with the slideway to deposit a can in the slideway when the pusher arm is in its rear position and the slideway in front of the arm is unoccupied by a can, brake means for preventing movement of cans from the last-mentioned inclined ramp to the slideway when the pusher arm of the slideway is advanced from its rear position toward the first drawing frame, said brake being actuated by the pusher arm upon movement thereof from its rear position.

References Cited

Japanese Patent Publication #37–17778 of OEM published Oct. 31, 1962, 19–159.

DORSEY NEWTON, *Primary Examiner.*

UNITED STATES PATENT OFFICE
CERTIFICATE OF CORRECTION

Patent No. 3,443,287                                                                May 13, 1969

Hans B. Hertzsch

It is certified that error appears in the above identified patent and that said Letters Patent are hereby corrected as shown below:

Column 7, line 5, "also" should read -- as --. Column 9, line 57, "drawings should read -- drawing --. Column 10, line 31, "can" should read -- cans --; line 57, "or" should read -- for --. Column 14, line 1, "statiton" should read -- station --; line 3, "of the direction of travel of strand material to" should read -- to the filling device to displace the filled can at --; line 8, "directition" should read -- direction --. Column 18, line 68, "intermedate" should read -- intermediate --.

Signed and sealed this 14th day of April 1970.

(SEAL)
Attest:

Edward M. Fletcher, Jr.             WILLIAM E. SCHUYLER, JR.
Attesting Officer                   Commissioner of Patents